No. 622,350. Patented Apr. 4, 1899.
B. B. HANS.
MASSAGE OR FLESH KNEADING DEVICE.
(Application filed Feb. 24, 1898. Renewed Feb. 23, 1899.)
(No Model.)
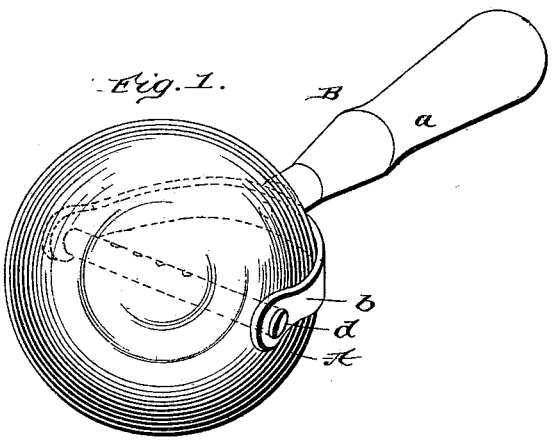
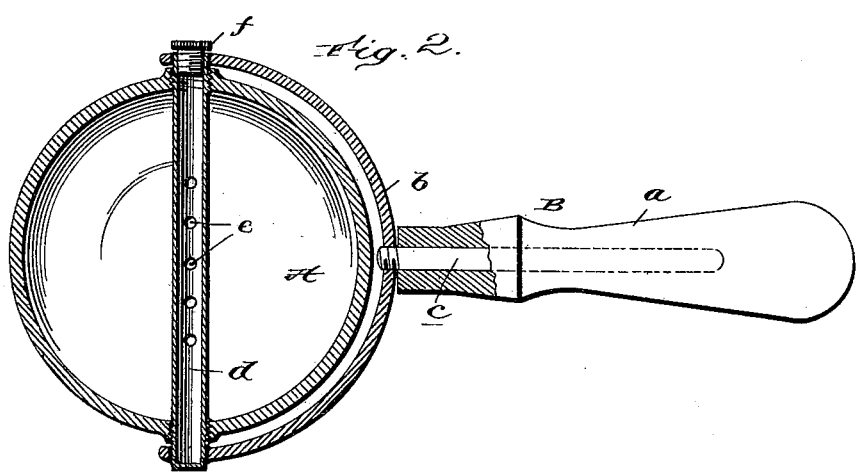

UNITED STATES PATENT OFFICE.

BERNARD B. HANS, OF NEW ORLEANS, LOUISIANA.

MASSAGE OR FLESH-KNEADING DEVICE.

SPECIFICATION forming part of Letters Patent No. 622,350, dated April 4, 1899.

Application filed February 24, 1898. Renewed February 23, 1899. Serial No. 706,553. (No model.)

*To all whom it may concern:*

Be it known that I, BERNARD B. HANS, a citizen of the United States, residing at New Orleans, in the parish of Orleans and State of Louisiana, have invented new and useful Improvements in Massage or Flesh-Kneading Devices, of which the following is a specification.

My invention relates to massage or flesh-kneading devices and contemplates the provision of such a device adapted to be used to advantage in reducing superfluous flesh and also in the treatment of rheumatism and similar ailments.

The invention will be fully understood from the following description and claims when taken in conjunction with the annexed drawings, in which—

Figure 1 is a perspective view of my improved device, and Fig. 2 is a sectional view of the same.

Referring by letter to said drawings, A designates the flesh-engaging roller of my improved device, which is of metal and hollow, and B designates the holder thereof, which in the preferred embodiment of the invention comprises a handle $a$, of wood or other suitable material, and a metallic bail $b$, which is resilient and is provided with a shank $c$, suitably secured in the handle, as shown.

The roller A is fixed by screw-threads or other suitable means upon a metallic tube $d$, as best shown in Fig. 2. This tube $d$ has its ends extended to form trunnions $d'$ $d^2$, which are journaled in the bail $b$ of the holder, so as to enable the roller to freely turn in the direction in which the device is pushed or pulled. Said tube $d$ also has its end forming the trunnion $d'$ closed and its opposite end, which forms the trunnion $d^2$, occupied by a removable plug $f$, and it is provided at intervals in its length with apertures $e$. In virtue of this construction it will be appreciated that when desired the roller A may be very conveniently filled with hot water, for a purpose presently described.

In using my improved device to remove superfluous flesh the roller A is pressed against and moved to and fro over the part of the body where such flesh is located. When this is done, the globular roller sinking in the flesh will serve to distend the skin and diffuse or spread and thereby reduce the flesh. While this is so, it will be appreciated that in virtue of the globular form of the roller the patient will not be subjected to any pain. Such globular form of roller is also advantageous because it permits of the device being used as a beater when desired.

When the device is used in the treatment of rheumatic complaints, the roller A is filled with hot water and pressed against and moved to and fro over the affected part or parts, when it will warm the flesh and relax the muscles and thereby afford relief.

Having thus described my invention, what I claim is—

1. A massage or flesh-kneading device comprising a suitable holder, a hollow globular roller and trunnions carried by and extending laterally from the roller and journaled in the holder; one of the said trunnions being hollow and in communication with the interior of the roller and having an inlet for water and a suitable means for normally closing the same, substantially as specified.

2. A massage or flesh-kneading device comprising a suitable holder, a tube journaled in the holder and having one of its ends closed and its opposite end normally closed by a plug and also having one or more apertures at an intermediate point of its length, and a hollow, globular roller fixed on said tube, substantially as specified.

In testimony whereof I have hereunto set my hand in presence of two subscribing witnesses.

BERNARD B. HANS.

Witnesses:
WILLIAM BOSE,
S. BERNSTEIN.